(12) United States Patent
Thomas et al.

(10) Patent No.: US 7,382,257 B2
(45) Date of Patent: *Jun. 3, 2008

(54) SINGLE RF OSCILLATOR SINGLE-SIDE BAND MODULATION FOR RFID READERS WITH FREQUENCY TRANSLATION AND FILTERING

(75) Inventors: Michael H. Thomas, Seattle, WA (US); Scott Anthony Cooper, Seattle, WA (US); Aanand Esterberg, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 320 days.

This patent is subject to a terminal disclaimer.

(21) Appl. No.: 11/073,292

(22) Filed: Mar. 4, 2005

(65) Prior Publication Data

US 2006/0211386 A1    Sep. 21, 2006

(51) Int. Cl.
*G08B 13/14* (2006.01)

(52) U.S. Cl. ............... 340/572.1; 375/344; 455/47; 455/109; 455/203

(58) Field of Classification Search ............ 340/572.1; 370/525; 375/270, 344; 455/47, 109, 203
See application file for complete search history.

(56) References Cited

U.S. PATENT DOCUMENTS

| | | | | |
|---|---|---|---|---|
| 4,852,086 A | * | 7/1989 | Eastmond et al. | .......... 370/343 |
| 5,164,985 A | * | 11/1992 | Nysen et al. | ............ 340/572.1 |
| 5,253,270 A | * | 10/1993 | Petit | ......................... 370/525 |
| 7,026,935 B2 | * | 4/2006 | Diorio et al. | ............ 340/572.1 |
| 7,107,022 B1 | * | 9/2006 | Thomas et al. | ............. 455/109 |
| 2005/0052282 A1 | * | 3/2005 | Rodgers et al. | .......... 340/572.1 |
| 2005/0099270 A1 | | 5/2005 | Diorio et al. | ............ 340/10.51 |
| 2006/0145855 A1 | * | 7/2006 | Diorio et al. | ............ 340/572.1 |

OTHER PUBLICATIONS

Notification of Transmittal of the International Search Report or the Declaration in connection with International Application No. PCT/US06/07636 dated Mar. 9, 2007.

* cited by examiner

*Primary Examiner*—John A Tweel, Jr.
(74) *Attorney, Agent, or Firm*—Merchant & Gould

(57) ABSTRACT

A transmitter shifts a baseband data signal having a bandwidth of $2\omega_M$ using a tone signal having a frequency $\omega_M$, which centers a sideband of the data signal at zero frequency. The transmitter then filters the shifted signal to filter out the non-centered sideband, and then adds the tone signal to form a composite signal. The transmitter upconverts the composite signal during a first operational mode using a RF signal having a frequency $\omega_C$ equal to a center frequency of a channel. In a second operational mode, the transmitter upconverts a DC level using the same RF signal. The upconverted DC level can be used as a continuous wave carrier signal having a frequency $\omega_C$. The transmitter has a single RF oscillator to output both a SSB signal centered at frequency $\omega_C$ during the first mode and a carrier signal of frequency $\omega_C$ during the second mode.

36 Claims, 8 Drawing Sheets

US 7,382,257 B2

SINGLE RF OSCILLATOR SINGLE-SIDE BAND MODULATION FOR RFID READERS WITH FREQUENCY TRANSLATION AND FILTERING

The present invention is related to the field of Radio Frequency IDentification (RFID) systems, and more specifically to Single-Sideband (SSB) modulation in RFID readers.

BACKGROUND

Radio Frequency IDentification (RFID) systems typically include tags and RFID readers, which are also known as RFID reader/writers. RFID systems can be used in many ways for locating and identifying objects to which they are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using a device called an RFID reader to interrogate one or more RFID tags. Interrogation is performed by the reader transmitting a Radio Frequency (RF) wave. A tag that senses the interrogating RF wave responds by transmitting back another RF wave. The tag generates the transmitted back RF wave either originally, or by reflecting back a portion of the interrogating RF wave, a process known as backscatter. Backscatter may take place in a number of ways.

The RF wave returned from a tag may further encode data stored internally in the tag, such as a number. The response, and the data if available, is decoded by the reader, which thereby identifies, counts, or otherwise interacts with the associated item. The data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included a power storage device, such as a battery. RFID tags with a power storage device are known as active tags. Advances in semiconductor technology have miniaturized the electronics so much that an RFID tag can be powered by the RF signal it receives enough to be operated. Such RFID tags do not include a power storage device, and are called passive tags.

In some RFID readers, data transmission is performed using double-sideband (DSB) modulation, with the information of one sideband being redundant. It is believed that, presently, no RFID readers use SSB modulation during transmission. SSB modulation is advantageous in that it requires half the bandwidth of DSB modulation to transmit the same amount of information.

SUMMARY

In accordance with various described aspects of the present invention, a SSB transmitter that uses a single RF local oscillator signal is provided. In one aspect, a transmitter shifts a baseband data signal having a bandwidth of $2\omega_M$ using a tone signal having a frequency $\omega_M$, which centers a sideband of the data signal at zero frequency. The transmitter then filters the shifted signal to filter out the non-centered sideband, and then adds the tone signal to form a composite signal. The transmitter upconverts the composite signal during a first operational mode using a RF signal having a frequency $\omega_C$ equal to a center frequency of a channel. The upconverted signal can then be amplified and/or transmitted to intended receiving units. In a second operational mode, the transmitter upconverts a DC level using the same RF signal. The upconverted DC level can be used as a continuous wave carrier signal having a frequency $\omega_C$. The transmitter has a single RF oscillator to output both a SSB signal centered at frequency $\omega_C$ during the first mode and a carrier signal of frequency $\omega_C$ during the second mode.

In another aspect, the transmitter is part of a transceiver and the carrier signal is used to downconvert a received signal having data modulated on the CW carrier signal.

In still another aspect, the transmitter performs quadrature SSB modulation by splitting the data signal and then shifting one portion by an in-phase (I) $\omega_M$ tone signal and the other portion using a quadrature (Q) $\omega_M$ tone signal. Both shifted signals are then filters to output SSB signals centered at zero frequency. The tone signals are then added to the SSB signals to form composite signals. The composite signals are then upconverted by I and Q mixers with an LO frequency of $\omega_C$. The upconverted composite signals are then combined before being amplified and/or transmitted to the intended receiving units.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments of the present invention are directed to a system, method and apparatus to generate and transmit a single-sideband, large carrier (SSB-LC) signal within a channel during transmit phase and then generate and transmit an unmodulated carrier signal in the center of the same channel during a receive phase. SSB-LC is used because in these embodiments the tag derives its energy from the reader transmit signal. A large carrier component is present during both the reader transmit phase (when modulated data is present) and the receive phase (when only the carrier is transmitted). Such embodiments can be advantageously used in RFID systems.

Figure 1:
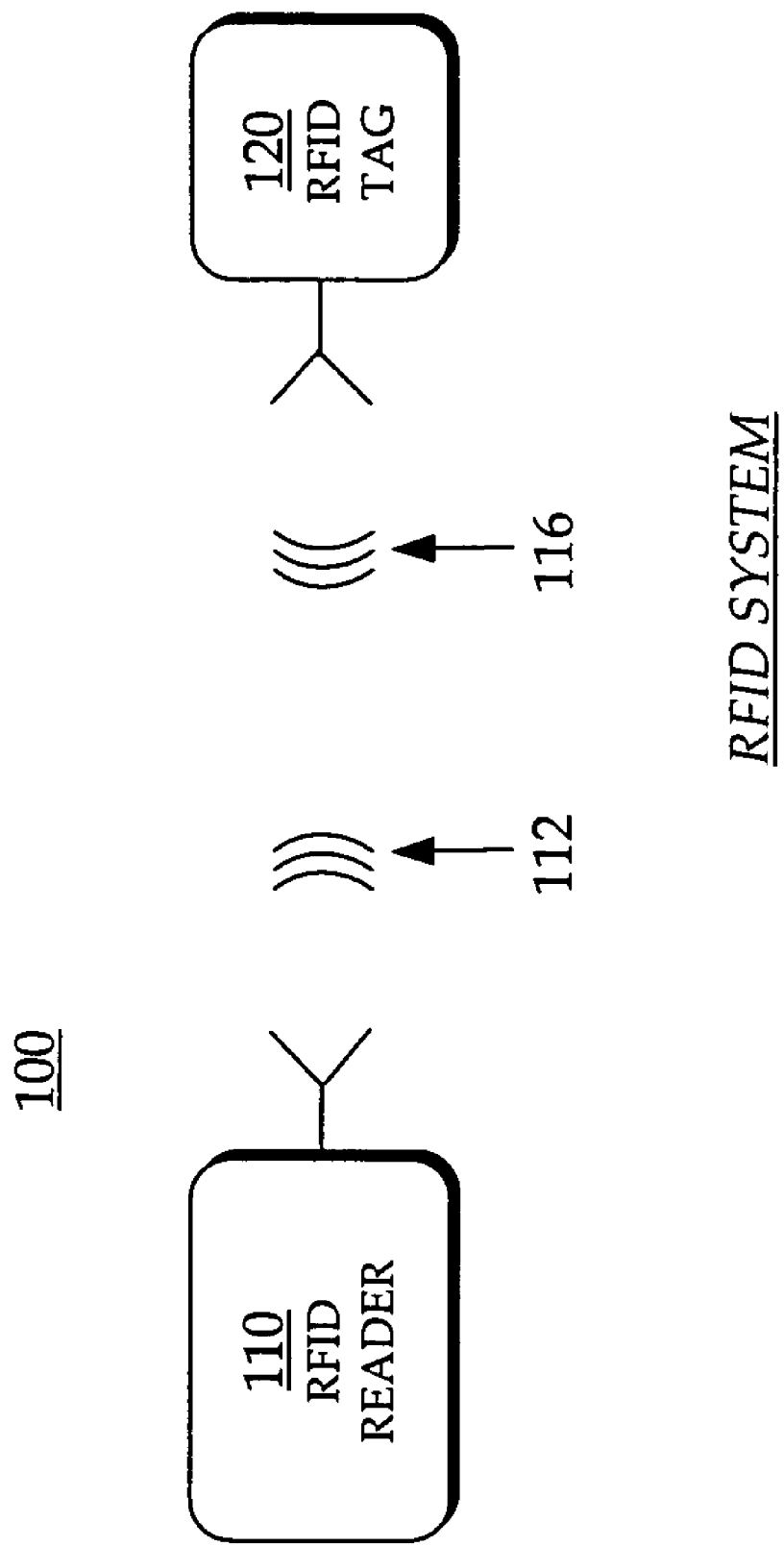
FIG. 1 is a block diagram illustrating an RFID system, according to one embodiment of the present invention.

FIG. 1 is a diagram of an RFID system 100 according to an embodiment of the invention. An RFID reader 110 made according to an embodiment of the invention transmits an interrogating Radio Frequency (RF) signal 112. An RFID tag 120 in the vicinity of RFID reader 110 may sense interrogating RF signal 112, and generate backscatter signal 116 in response. RFID reader 110 senses and interprets backscatter signal 116.

Reader 110 and tag 120 exchange data via signal 112 and signal 116. In a session of such an exchange, each encodes and transmits data to the other, and each receives and decodes data from the other. The data is encoded into, and decoded from, RF waveforms, as will be seen in more detail below. The data itself can be binary, such as "0" and "1". For RFID purposes, it has become common to think of the binary data as RFID symbols.

Figure 2:
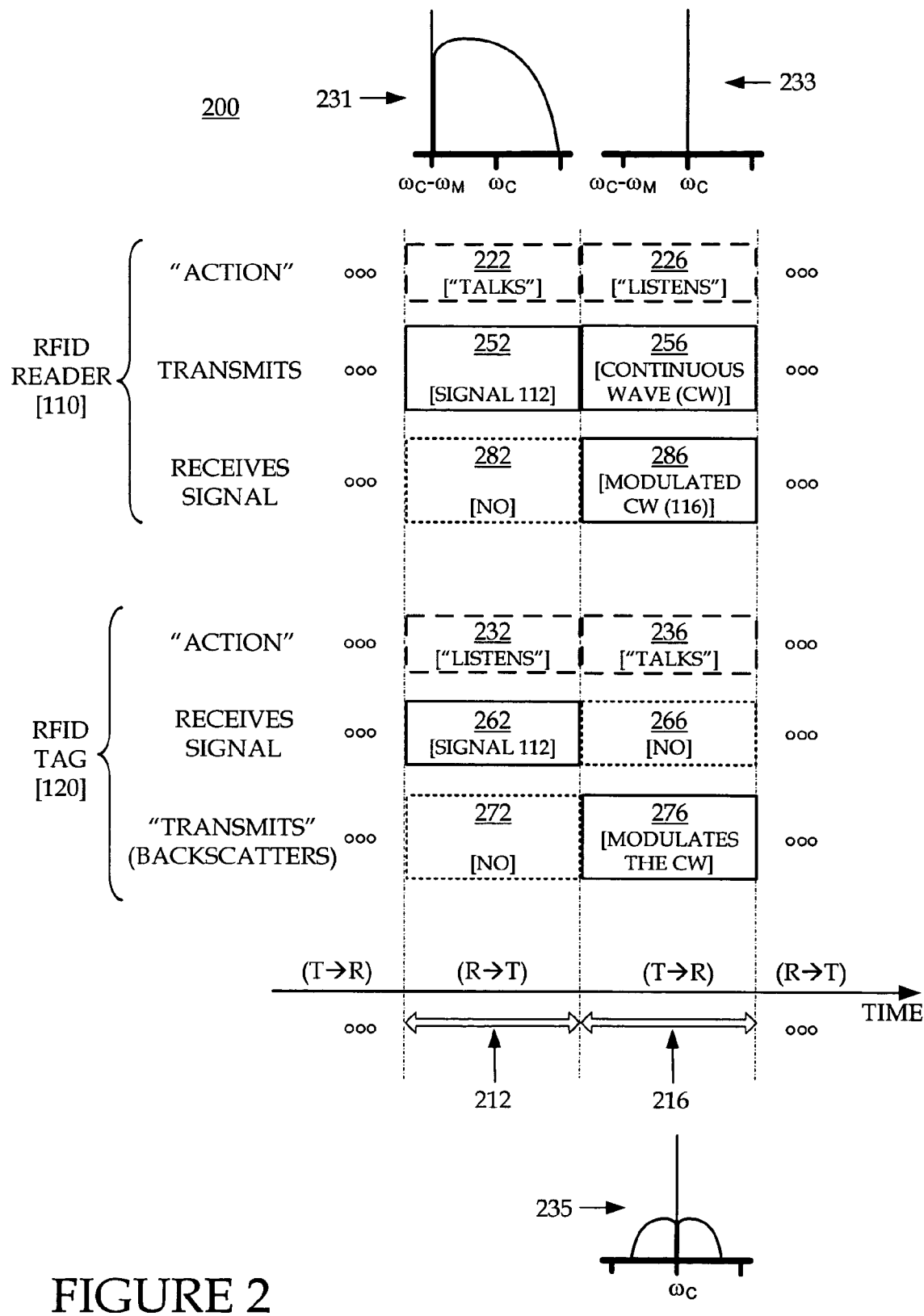
FIG. 2 is a conceptual diagram for explaining the mode of communication between components of the RFID system of FIG. 1.

FIG. 2 is a conceptual diagram 200 for explaining a mode of communication between the components of RFID system 100 of FIG. 1. The explanation is made with reference to a TIME axis, and also to a human metaphor of "talking" and "listening". Exemplary technical implementations for "talking" and "listening" are then described.

RFID reader 110 and RFID tag 120 talk and listen to each other taking turns. As seen on axis TIME, when reader 110 talks to tag 120 the session is designated as "R→T", and when tag 120 talks to reader 110 the session is designated as "T→R". Along the TIME axis, a sample R→T session occurs during a time interval 212, and a following sample T→R session occurs during a time interval 216. Of course intervals 212, 216 can be of variable durations—here the durations are shown approximately equal for purposes of illustration.

As illustrated by blocks 222 and 226, RFID reader 110 talks during interval 212, and listens during interval 216. As illustrated by blocks 232 and 236, RFID tag 120 listens while reader 110 talks (during interval 212), and talks while reader 110 listens (during interval 216).

The remaining blocks below block 222 describe the tag and reader functions in more detail when the reader is talking. As illustrated by block 252, reader 110 transmits information via a modulated RF carrier signal, corresponding to signal 112 in FIG. 1. At the same time, as illustrated by block 262, tag 120 receives signal 112 and processes it. Meanwhile, as illustrated by to block 272, tag 120 does not backscatter with its antenna, and as illustrated by block 282, reader 110 has no signal to receive from tag 120.

During interval 216, tag 120 talks to reader 110 as follows. As illustrated by block 256, reader 110 transmits towards the tag a Continuous Wave (CW) RF signal, which includes no information content (modulation). As discussed before, this serves both to be harvested by tag 120 for its own internal power needs, and also to generate a wave that tag 120 can backscatter. Indeed, at the same time, as illustrated by block 266, tag 120 does not receive a signal for processing. Instead, as illustrated by block 276, tag 120 modulates the CW emitted according to block 256, so as to generate backscatter signal 116. Concurrently, according to block 286, reader 110 receives backscatter signal 116 and processes it.

Spectrum 231 of signal 112 during interval 212 is also shown in FIG. 2. As can be seen, in this embodiment, spectrum 231 of signal 112 is a single-sideband (SSB) signal with a carrier signal having a frequency of $\omega_C-\omega_M$. $\omega_C$ is the frequency of the aforementioned CW and $\omega_M$ is ideally equal to half of the modulation bandwidth of the information signal. This approach maximizes bandwidth utilization by centering the SSB signal in the available RF channel. In other embodiments, the carrier signal may be at a frequency of $\omega_C+\omega_M$.

During interval 216, reader 110 transmits the CW. As shown in FIG. 2, in this embodiment, spectrum 233 of the CW is essentially a single frequency signal at $\omega_C$. Spectrum 235 of signal 116 during interval 216 is also shown in FIG. 2. In this embodiment, signal 116 has a double sideband (DSB) spectrum centered about the CW.

Further, as will be described further below, in accordance with embodiments of the present invention, reader 110 uses a single RF local oscillator (LO), having a frequency of $\omega_C$, to generate a RF signal that facilitates RF upconversion of either the complex baseband modulation signal during R→T operation or a DC level during T→R operation. The composite RF signal after upconversion, 112, transmitted by reader 110 is centered at $\omega_C$, the center frequency of the RF channel, during both R→T and T→R intervals. In accordance with embodiments of the present invention, during interval 212, the baseband SSB modulator presents a DC-centered composite information signal to an RF upconverter with LO frequency of $\omega_C$. The resulting RF transmission, 231, is thus centered at $\omega_C$ illustrated in block 252. During interval 216, the modulator of reader 110 is bypassed and a DC level is presented to the RF upconverter driven by the identical LO. The result is a CW carrier centered at $\omega_C$, 233, illustrated in block 256. Various transceiver implementations that provide functionality are described below.

Figure 3:
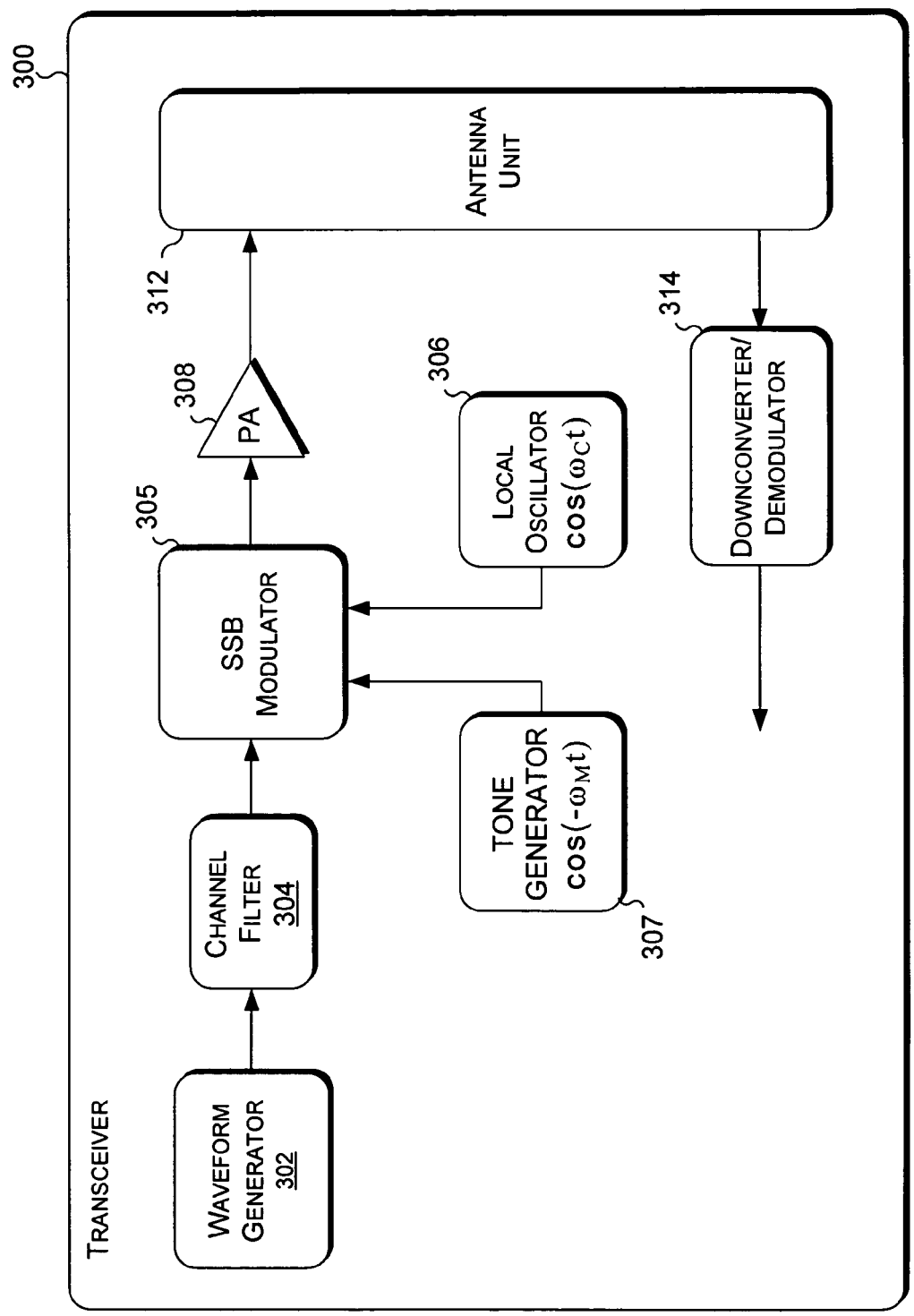
FIG. 3 is a block diagram illustrating a portion of a transceiver included in the reader of FIG. 1, according to one embodiment of the present invention.

FIG. 3 illustrates a portion of a transceiver 300 capable of generating a SSB signal and center channel carrier signal using single RF LO, according to one embodiment of the present invention. In this embodiment, transceiver 300 includes a waveform generator 302, a channel filter 304, a SSB modulator/upconverter 305 (also referred to as SSB modulator 305), an RF LO 306, a tone generator 307, a power amplifier (PA) 308, an antenna unit 312 and a downconverter/demodulator 314. Although this embodiment of transceiver 300 implements a direct-conversion receiver, other embodiments may include an intermediate frequency (IF) stage.

In operation during a transmit mode, waveform generator 302 provides a digital signal corresponding to digital data to be transmitted. Channel filter 304 filters the digital data signal so that, after digital-to-analog conversion, a sideband of the filtered signal's spectrum will be contained in the intended channel's frequency band. SSB modulator 305 then receives the filtered analog data signal and performs SSB modulation (an embodiment of which is described below in conjunction with FIG. 4) to modulate the data onto a carrier signal so that the SSB data signal is centered in the channel (i.e., frequency $\omega_C$). In this embodiment, an RF signal is generated by RF LO 306 to have frequency of $\omega_C$, which is then received by SSB modulator 305 to upconvert the SSB data signal. Further, in this embodiment, SSB modulator 305 uses a tone signal (i.e., $\cos(-\omega_M)t$) to shift the baseband data signal before upconversion, where frequency $\omega_M$ is ideally one half of the spectral width of a sideband of the data signal. In this way, the SSB data signal can be centered on the carrier frequency and contained in the channel. Without this frequency shift prior to upconversion, the SSB data signal will not be centered on the carrier frequency $\omega_C$ when upconverted by the $\omega_C$ signal from LO 306.

PA 308 then receives the output signal from SSB modulator 305 and amplifies it for broadcast via antenna unit 312.

In some embodiments, antenna unit 312 includes a duplexer (e.g., directional coupler, circulator, etc.) so that a single antenna can be used for both transmitting and receiving RF signals. In other embodiments, antenna unit 312 may include separate transmit and receive antennas.

In operation during a receive mode, this embodiment of transceiver 300 transmits an unmodulated or continuous wave (CW) signal to provide a carrier signal that a tag (e.g., tag 120 in FIG. 1) may modulate (e.g., backscatter) and from which the tag may scavenge power. In this receive mode, downconverter/demodulator 314 receives a backscatter signal via antenna unit 312. In one embodiment, downconverter/demodulator 314 forms a direct conversion receiver to directly obtain baseband I and Q components signals from the received backscatter signal.

To generate the CW carrier signal during the receive mode, in one embodiment, waveform generator 302 of transceiver 300 is disabled or isolated from SSB modulator 305. SSB modulator 305 then upconverts a DC level using the same RF signal generated by LO 306 (at a frequency of $\omega_C$). The DC level is selected so that the transmitted CW carrier signal has a desired amplitude. Although not shown in FIG. 3, this same RF signal from LO 305 can be used by downconverter/demodulator 314 to downconvert the received backscatter. Thus, only one single-frequency RF oscillator is needed to both output the CW carrier signal and to center the spectrum of the SSB data signal on the carrier signal frequency. Otherwise, the transceiver might have to have two LOs: one generating an RF signal having a frequency $\omega_C+\omega_M$ to upconvert the SSB data signal, and another outputting an RF signal having a frequency $\omega_C$ to be transmitted as the CW carrier signal. Thus, the size and cost of transceiver 300 can be advantageously reduced.

Figure 4:
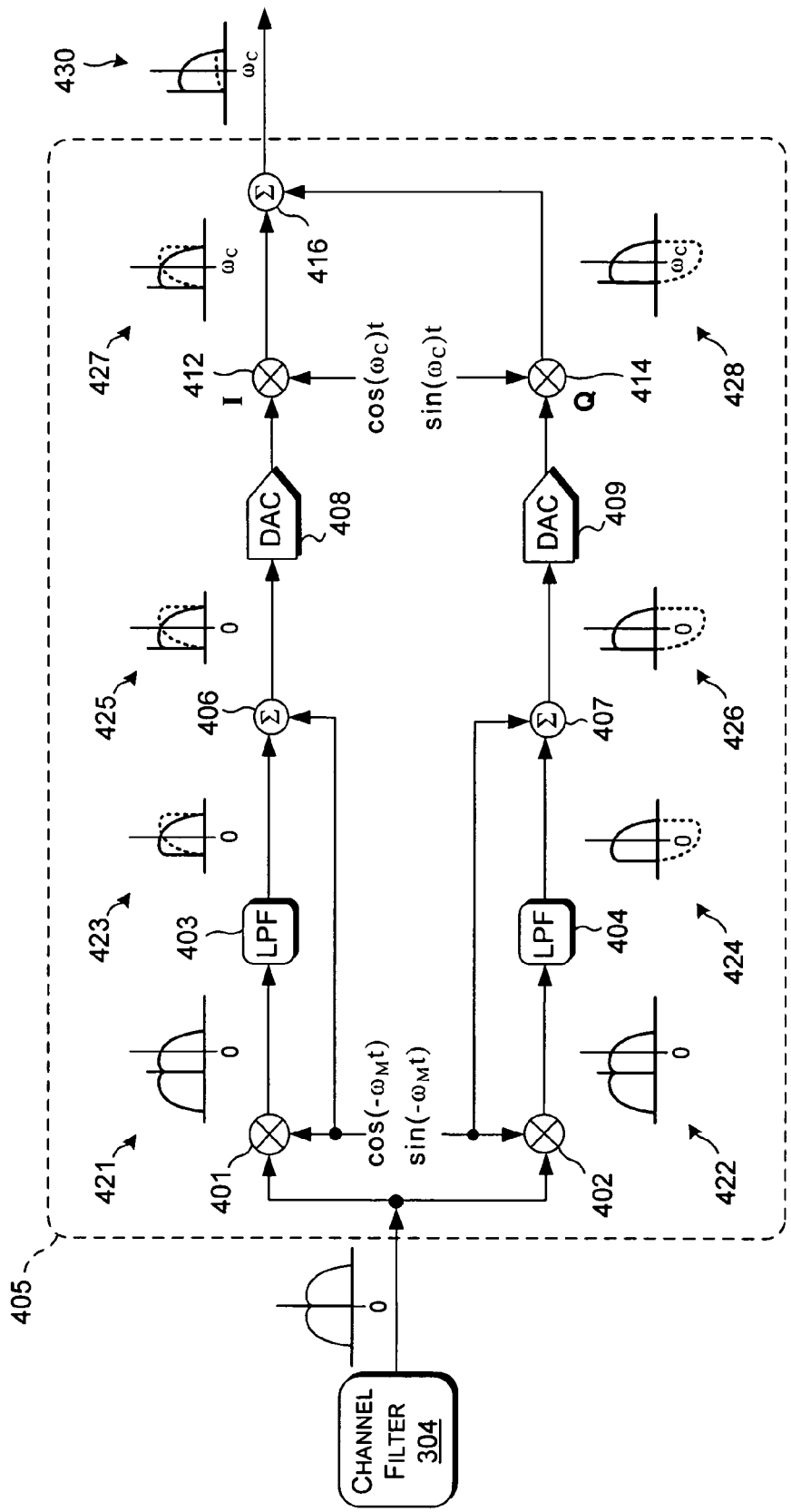
FIG. 4 is a block diagram illustrating a digital-based SSB modulator for use in a RFID reader with various signal spectra during reader transmission, according to one embodiment of the present invention.
Figure 5:
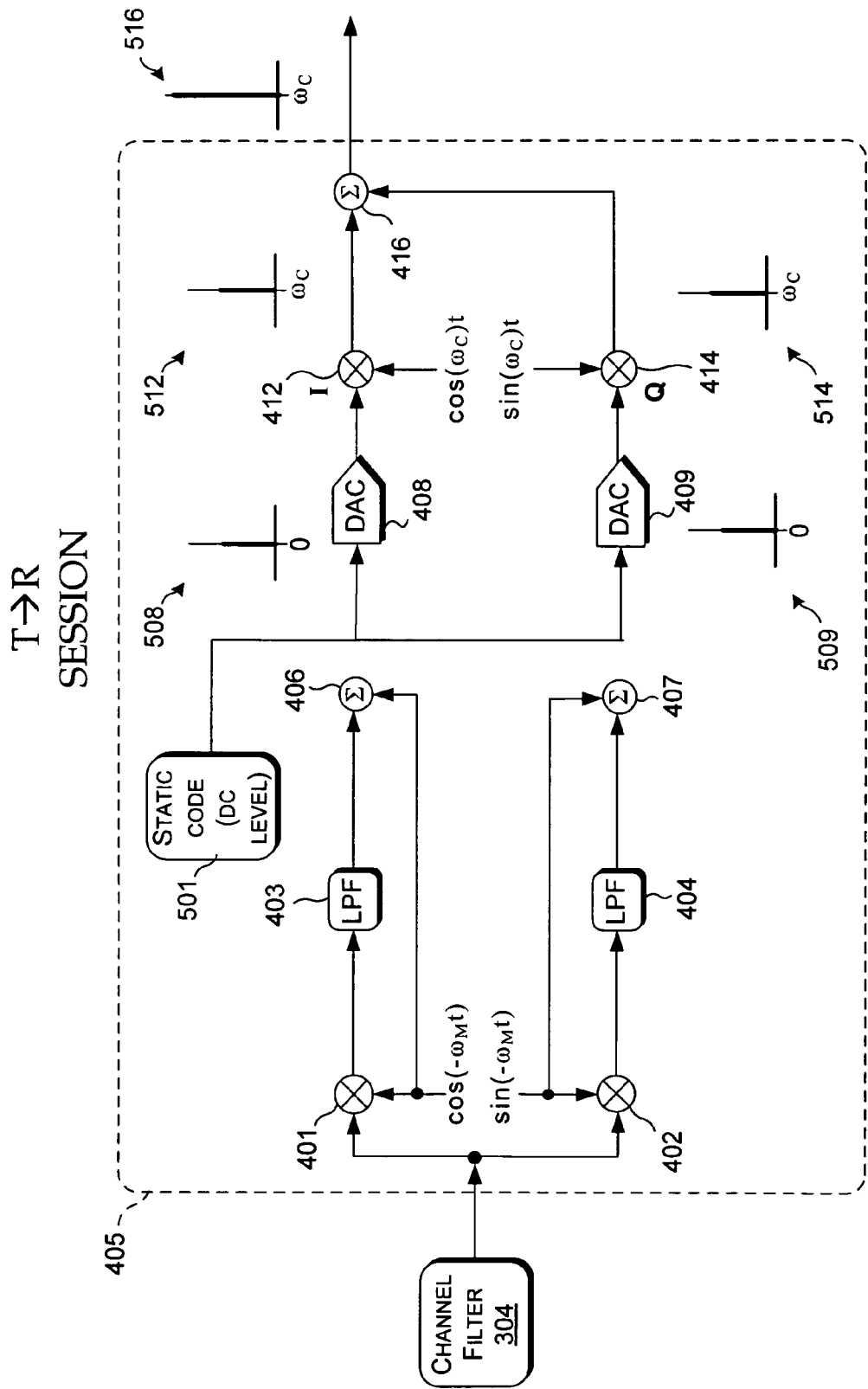
FIG. 5 is block diagram illustrating a digital-based SSB modulator of FIG. 4 with various signal spectra during reader reception, according to one embodiment of the present invention.

FIG. 4 illustrating a digital-based SSB modulator 405 for use in a RFID reader during reader transmission (note, FIG. 5 illustrates SSB modulator 405 during reader reception), according to one embodiment of the present invention. In this example implementation, SSB modulator 405 includes a baseband SSB modulator component and a RF upconverter component. In this embodiment, the baseband SSB modulator component of SSB modulator 405 includes tone signal mixers 401 and 402, low pass filters (LPFs) 403 and 404, summers 406 and 407, digital-to-analog converters (DACs) 408 and 409. The RF upconverter component of SSB modulator 405 includes RF signal mixers 412 and 414 and a summer 416.

In operation during reader transmission, SSB modulator 405 receives a digital data signal having a spectrum 419. In this embodiment, the digital data signal is received by mixers 401 and 402 of SSB modulator 405. In this example embodiment, the digital data signal is generated by waveform generator 302 (FIG. 3) and filtered by channel filter 304 so that a sideband of the data signal can be contained in the intended channel after upconversion. In this embodiment, each sideband of the filtered digital data signal has a spectral width that is ideally $2\omega_M$.

Mixers 401 and 402 each shift its received filtered digital data signal by $-\omega_M$. In this example embodiment, mixer 401 uses a digital tone signal $\cos(-\omega_M)t$ to generate a shifted in-phase (I) component signal as illustrated by spectrum 421, whereas mixer 402 uses a digital tone signal $\sin(-\omega_M)t$ to generate a shifted quadrature (Q) component signal as illustrated by spectra 422. Spectra 421 and 422 are illustrated with the image spectra omitted to improve clarity. After shifting by mixers 401 and 402, the upper sidebands of the resulting shifted signals are centered at zero frequency with a maximum frequency ideally at frequency $\omega_M$.

The tone signals used to shift the digital data signals are typically of much lower frequency (e.g., 40 kHz) than the RF carrier signal (e.g., 900 MHz) and, thus, can be generated using a tone generator (not shown) that does not require an RF oscillator. Such a tone generator is typically less costly to implement in a transceiver than an RF oscillator.

The shifted digital data signals from mixers 401 and 402 are then filtered by LPFs 403 and 404. In this embodiment, LPFs 403 and 404 have cutoff frequency of $\omega_M$. The resulting filtered signal outputted by LPF 403 has a spectrum 423, which includes the filtered lower sideband of the image spectrum shown in dashed lines. Similarly, the resulting filtered signal outputted by LPF 404 has a spectrum 424, which includes the filtered lower sideband of the image spectrum shown in dashed lines. Because a $\sin(-\omega_M)t$ tone signal was used by mixer 402, the lower sideband of the image spectrum in inverted compared to that outputted by mixer 401 as shown in spectrum 424.

Summer 406 sums the digital $\cos(-\omega_M)t$ tone signal and the digital signal from LPF 403 to insert the tone signal to the filtered data signal. The resulting summed signal has the tone signal at the lower edge of its spectrum (i.e., at frequency $-\omega_M$), as illustrated by a spectrum 425. Similarly, summer 407 sums the digital $\sin(-\omega_M)t$ tone signal and the digital signal from LPF 404 to insert the tone signal to the filtered data signal. The resulting summed signal has the tone signal at the lower edge of its spectrum (i.e., at frequency $-\omega_M$), as illustrated by a spectrum 426.

DACs 408 and 409 respectfully convert the digital signals outputted by summers 406 and 407. The analog signals outputted by DACs 408 and 409 are then upconverted by mixers 412 and 414, respectively. More particularly, mixers 412 and 414 also respectively receive RF carrier signals $\cos(\omega_C)t$ and $\sin(\omega_C)t$. Mixers 412 and 414 then use these RF signals to upconvert the analog SSB signals from DACs 408 and 409. The resulting upconverted signals have spectra 427 and 428, which are both centered about frequency $\omega_C$. In one embodiment, these RF signals are generated using the output signal of LO 306 (FIG. 3).

Summer 416 then sums the upconverted signals outputted by mixers 412 and 414. The lower sidebands of the image portions (i.e., the dashed lines) of spectra 427 and 428 ideally cancel, resulting a SSB signal centered on frequency $\omega_C$, and having the reinserted tone signal at the lower edge of the channel to be used by the tags in demodulating the SSB data signal transmitted by the RFID reader. The resulting signal has a spectrum 430, and is then transmitted to tags via antenna unit 312 (FIG. 3). In this example, spectrum 430 contains an image signal, indicated by the dashed lines, which results from non-ideal performance of the reader's components. However, as seen in spectrum 430, the image lies within the channel, which can be advantageous due to out-of-band spurious noise limitations imposed for government regulations that apply RFID systems.

FIG. 5 illustrates digital-based SSB modulator 405 (FIG. 4) during reader reception, according to one embodiment of the present invention. In this embodiment, a static code component 501 (omitted from FIG. 4 to improve clarity) provides a DC level to the input ports of DACs 408 and 409 during reader reception. In addition, the output ports of summers 406 and 407 are isolated from the input ports of DACs 408 and 409. Any suitable mechanism can be used to provide this isolation. For example, some embodiments of SSB modulator 405 include multiplexers (not shown) configured to selectively couple summers 406 and 407 to DACs 408 and 409, respectively during the reader transmit phase, and to selectively couple static code component 501 to DACs 408 and 409, respectively, during the reader reception phase.

DACs 408 and 409 convert the static code to DC levels, which have spectra 508 and 509. The resulting analog DC signals are used by mixers 412 and 414 to scale the amplitude of RF carrier signals $\cos(\omega_C)t$ and $\sin(\omega_C)t$, as shown by spectra 512 and 514. Summer 416 then sums the scaled RF carrier signals, resulting in an output signal having a spectrum 516. This output signal is then transmitted via antennal unit 312 (FIG. 3) during the reader reception phase to serve as a CW carrier signal used by the tags. The embodiments of SSB modulator 405 described above in conjunction with FIGS. 4 and 5 advantageously use only one single-frequency RF oscillator to generate the CW carrier signal (described in conjunction with FIG. 5) and to center the spectrum of the SSB data signal on the carrier signal frequency (described in conjunction with FIG. 4).

Figure 6:
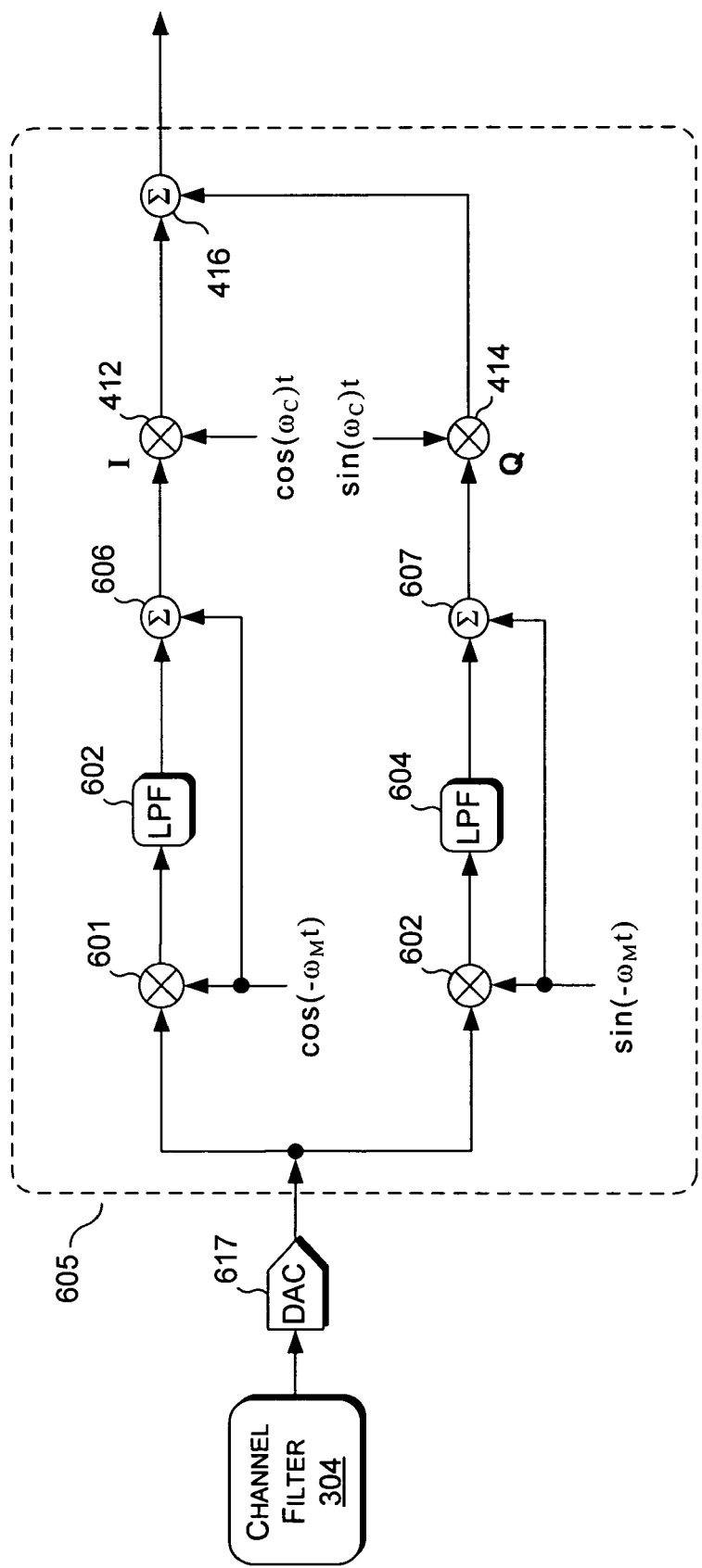
FIG. 6 is block diagram illustrating an analog implementation of a SSB modulator, according to one embodiment of the present invention.

FIG. 6 illustrates an analog-based SSB modulator 605, according to one embodiment of the present invention. In this embodiment, analog-based SSB modulator 605 includes a baseband SSB modulator component that includes an analog mixer 601, an analog mixer 602, an analog LPF 603, an analog LPF 604, an analog mixer 606, an analog mixer 607 which replace the digital mixers and LPFs of digital-based SSB modulator 405 (FIG. 4). In addition, analog-based SSB modulator 605 includes channel filter 304, and an RF upconverter component that includes mixer 412, mixer 414 and coupler 416, which operates in substantially the same manner as described above for digital-based SSB modulator 405.

In reader transmit phase, SSB modulator 605 receives an analog data signal. In this embodiment, the analog data signal is generated by a waveform generator, whose digital output is filtered by channel filter 304 and converted to analog by a DAC 617. In this embodiment, the analog data signal is received by mixers 601 and 602 of SSB modulator 605 via a 3 dB splitter (not shown). In this example embodiment, the resulting analog data signal has a sideband that can be contained in the intended channel after upconversion.

Mixers 601 and 602 each shift its received portion of the analog data signal by a frequency of $-\omega_M$. In this example embodiment, mixer 601 uses an analog tone signal $\cos(-\omega_M)t$ to generate a shifted in-phase (I) component signal, whereas mixer 602 uses an analog tone signal $\sin(-\omega_M)t$ to generate a shifted quadrature (Q) component signal. After shifting by mixers 601 and 602, the upper sidebands of the resulting shifted signals are centered at zero frequency with a maximum frequency ideally at frequency $\omega_M$.

The shifted analog data signals from mixers 601 and 602 are then filtered by LPFs 603 and 604. In this embodiment, LPFs 603 and 604 have cutoff frequency of $\omega_M$. The lower sideband of the image spectrum of the output of mixer 602 is inverted compared to that outputted by mixer 601. Summer 606 sums the analog $\cos(-\omega_M)t$ tone signal and the analog signal from LPF 603 to insert the tone signal to the filtered data signal. The resulting summed signal has the tone signal at the lower edge of its spectrum (i.e., at frequency $-\omega_M$). Similarly, summer 607 sums the analog $\sin(-\omega_M)t$ tone signal and the analog signal from LPF 604 to insert the tone signal to the filtered data signal. The resulting summed signal also has the tone signal at the lower edge of its spectrum (i.e., at frequency $-\omega_M$).

Mixers 412 and 414 also receive RF carrier signals $\cos(\omega_C)t$ and $\sin(\omega_C)t$, respectively. More particularly, mixers 412 and 414 also respectively receive RF carrier signals $\cos(\omega_C)t$ and $\sin(\omega_C)t$. Mixers 412 and 414 then use these RF signals to upconvert the analog SSB signals from summers 606 and 607. The resulting upconverted signals have spectra that are centered about frequency $\omega_C$. In one embodiment, these RF signals are generated using the output signal of LO 306 (FIG. 3).

Summer 416 then sums the upconverted signals outputted by mixers 412 and 414. The lower sidebands of the image portions of the upconverted signals ideally cancel. The resulting signal is a SSB signal centered on frequency $\omega_C$ having the reinserted tone signal at the lower edge of the channel, which is to be used by the tags in demodulating the SSB data signal transmitted by the RFID reader.

Figure 7:
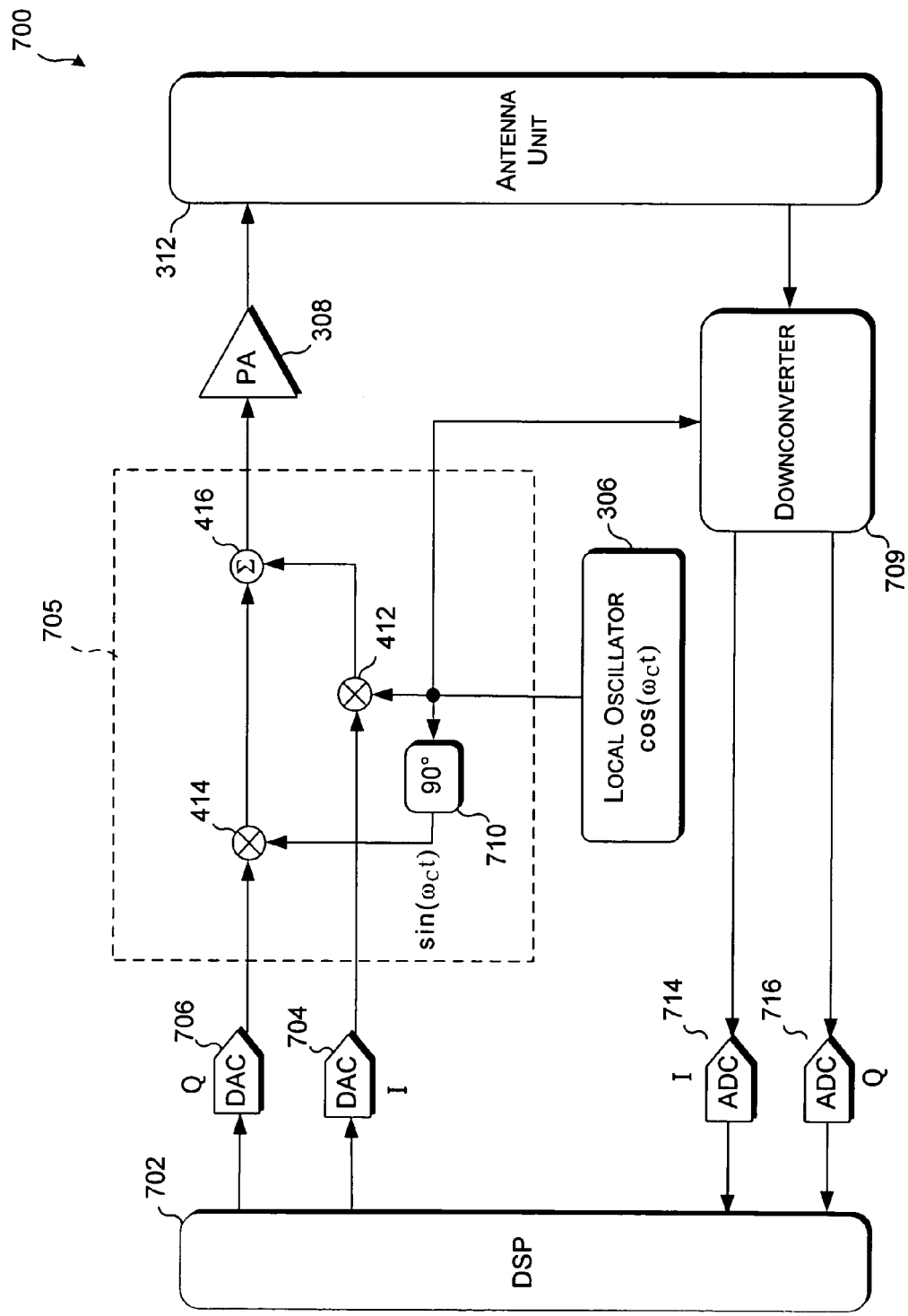
FIG. 7 is a block diagram illustrating a reader having a single fixed-frequency local oscillator (LO) for both the transmit upconversion and receive downconversion, according to one embodiment of the present invention.

FIG. 7 illustrates a reader 700 having a single, fixed-frequency LO for both the transmit upconversion and receive downconversion, according to one embodiment of the present invention. This embodiment is similar to the embodiment of FIG. 3 except that the waveform generator, the channel filter, the baseband SSB modulator, and the baseband demodulator are implemented in software executed by a processor (e.g., a digital signal processor). For example, SSB upconverter/modulator 305 and downconverter/demodulator 314 are replaced with an upconverter and a downconverter, with the functions of the SSB modulator and the SSB demodulator being performed in software.

In this embodiment, reader 700 includes a digital signal processor (DSP) 702, DACs 704 and 706, an upconverter 705, analog-to-digital converters (ADCs) 714 and 716, a downconverter 709, and a quadrature circuit 710. This embodiment of reader 700 also includes LO 306, PA 308, and antenna unit 312, previously described in conjunction with the embodiment of FIG. 3.

In R→T operation, DSP 702 is configured with software (or firmware or combination of software and firmware) to implement the functions of the baseband SSB modulator component. For example, in one embodiment DSP 702 can be configured to implement the quadrature modulator, channel filter, digital tone frequency shifter, LPFs, and summers described above in conjunction with FIG. 4 and thereby generate SSB digital data signals having spectra 421 and 425 (FIG. 4). DACs 706 and 704 convert the digital signals to analog signals, which are then upconverted by upconverter 705. In this embodiment, an RF signal is generated by LO 306 to have frequency of $\omega_C$, which is then received by mixer 412 and quadrature circuit 710. Quadrature circuit 710 causes a phase inversion in the RF signal, which is then received by mixer 414. Mixers 412 and 414 then upconvert the analog signals from DACs 706 and 704 so that the filtered sidebands are centered at frequency $\omega_C$, as described above for the embodiment of FIG. 4. Because the sideband of the upconverted image signal from mixer 414 is ideally the inverse of the sideband of the upconverted image signal from mixer 412, the image sidebands cancel each other and the resulting signal is substantially a SSB data signal centered on frequency $\omega_C$. Coupler 416 then sums the upconverted analog signals and provides the composite signal to antenna unit 312 (FIG. 4) for broadcast.

In T→R operation, DSP 702 is configured in one embodiment to implement static code component 501 (FIG. 5) and output the static code to DACs 706 and 704. DACs 706 and 704 output the corresponding DC level to upconverter 705. Mixers 412 and 414 of upconverter 705 then scale the RF mixing signals from LO 306 and quadrature circuit 710 in response to the DC levels, as described above for the embodiment of FIG. 5. These upconverted signals are then received by combiner 416 and summed. The scaled RF signals constructive combine and the resulting signal is substantially a single-frequency CW carrier signal having a frequency $\omega_C$.

Figure 8:
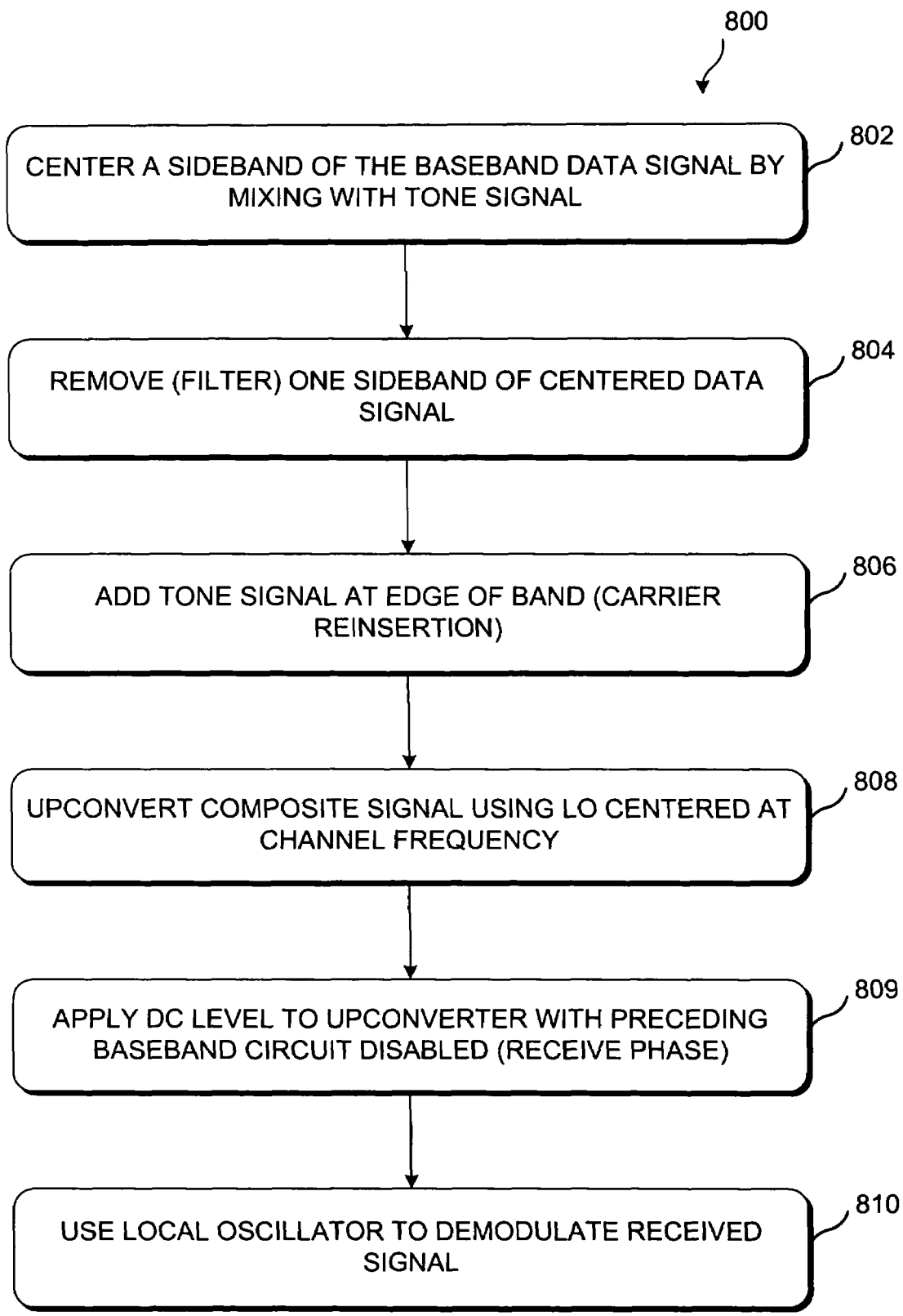
FIG. 8 is a flow diagram illustrating operational flow in generating a SSB signal and center channel carrier signal using a single RF local oscillator, according to one embodiment of the present invention.

FIG. 8 is a flow diagram illustrating operational flow 800 in generating a SSB signal and center channel carrier signal using a single-frequency RF signal, according to one embodiment of the present invention. More particularly, using this single-frequency signal, the operational flow is used to transmit a SSB data signal centered in a channel during a R→T operation and a CW carrier signal centered in the channel during T→R operation. In accordance with this exemplary operational flow, a component (e.g., a transceiver or a RFID reader) to perform the operational flow can be advantageously implemented using a single RF LO.

Operational flow 800 may be executed by transceiver 300 of FIG. 3, reader 700 of FIG. 7, or other embodiments described above, and therefore the description of FIG. 8 may refer to at least one of the components of FIG. 3 or 7. However, any such reference to a component of FIG. 3 or 7 is for descriptive purposes only, and it is to be understood that the implementations of FIGS. 3 and 7 are a non-limiting environments for operational flow 800.

In a first operational mode, at a block 802, a sideband of a baseband data signal is centered about zero frequency. For example, this first operational mode can be R→T operation of an RFID system. In some embodiments, the selected sideband (either upper or lower) is centered at zero by mixing the baseband data signal with a tone signal. The data and tone signals may be in either digital or analog form. For example, a tone generator outputting a tone signal of frequency $\omega_M$ similar to tone generator 307 (FIG. 3) can be used to shift a data signal having a sideband width of $2\omega_M$. The resulting shifted data signal has a sideband centered at zero frequency.

At a block 804, one of the sidebands of the frequency-shifted data signal is removed (e.g., by filtering the frequency-shifted data signal using a low pass filter with cutoff frequency $\omega_C$). For example, a low pass filter such as filter 403 (FIG. 4) can be used to filter pass the sideband centered at zero frequency and filter out the other sideband.

At a block 806, the tone signal is added to the filtered signal (i.e., a single sideband signal) to form a composite signal. In one embodiment, the tone signal is added at one of the edges of the pass band. For example, if the tone signal was $\cos(-\omega_M)t$, the tone signal would be at reinserted at frequency $-\omega_M$ as shown by spectrum 425 (FIG. 4).

At a block 808, the composite signal is upconverted to the intended RF channel. In one embodiment, a LO such as LO 306 (FIG. 3) is used to generate a RF signal $\cos(\omega_C)t$ that is used to shift the composite signal by $\omega_C$. The upconverted composite signal is then transmitted to the intended receiving unit (e.g., RFID tags). In some embodiments, a power amplifier and antenna unit (such as PA 308 and antenna unit 312 of FIG. 3) can be used to transmit the composite signal to the intended receiving units. The use of a relatively low frequency tone signal in this embodiment allows the transmitter (or transceiver) to be implemented using only one single-frequency RF LO, thereby reducing the cost of the transmitter.

In a second operational mode, at a block 809, a DC level (instead of a data signal) is upconverted. For example, this second operational mode can be T→R operation of an RFID system. In one embodiment, a static code component such as static code component 501 (FIG. 5) is used to provide a DC level to be upconverted to form a CW RF carrier signal. The DC level can be selected to achieve a desired amplitude of the CW RF carrier signal. The CW RF signal is then transmitted to the intended receiving units during the second operational mode.

At a block 810, the transmitted RF signal is also used to downconvert a received signal having data modulated on a carrier signal having the same frequency as the CW RF carrier signal transmitted at block 809. For example, the received signal can be backscatter from a tag in an RFID embodiment. This "downconverting" signal can be taken directly from the LO used to generated the CW RF carrier signal or coupled off the transmit path of the CW RF carrier signal.

Although operational flow 800 as described above has only a single SSB modulation path, the description can also apply to quadrature systems by: (a) splitting the data signal into two paths; (b) performing operational flow 800 on one path; (c) concurrently performing on the other path an operational flow that is substantially similar to operational flow 800 (but with tone and RF mixing signals that are 90° out of phase with the tone and RF mixing signals of operational flow 800); and (d) summing the signals from the two paths before transmission to the intended receiving units.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

In addition, embodiments of the present invention may be implemented not only with physical components (e.g., within a semiconductor chip), but also within machine-readable media. For example, the designs described above may be stored upon and/or embedded with machine readable media associated with a design tool used for designing semiconductor devices. Examples include designs defined/formatted in VHSIC Hardware Description Language (VHDL), Verilog language and SPICE language. Some netlist examples include: a behavior level netlist, a register transfer level (RTL) netlist, a gate level netlist, and a transistor level netlist. Machine readable media also include media having layout information such as a GDS-II file. Further, netlist files or other machine-readable media for semiconductor chip design may be used in a simulation to perform the methods of the embodiments disclosed herein.

Thus, embodiments of the present invention may be used as or to support software program executed upon some form of processing core (e.g., a CPU of a computer) or otherwise implemented or realized upon or within a machine-readable medium. A machine-readable medium includes any mechanism for storing or transmitting information in a form readable by a machine (e.g. a computer). For example, a machine-readable medium can include read only memory (ROM), random access memory (RAM), magnetic disk storage media, optical storage media, flash memory devices, etc. In addition, machine-readable media can include propagated signals such as electrical, optical, acoustical or other form of propagated signal (e.g., carrier wave signals, infrared signals, digital signals, etc.)

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A circuit for generating a single-sideband (SSB) modulated RF signal, the circuit comprising:
    a waveform generator to output a modulated data waveform during transmit phase wherein the data waveform has a SSB bandwidth substantially within a preselected wireless communication channel;
    a tone generator to output a tone signal, the tone signal having a frequency that depends on the maximum baseband frequency of a data signal to be transmitted during the transmit phase;
    a local oscillator to output signal having a frequency that is substantially equal to a center frequency of a wireless communication channel; and a SSB modulator to output a RF signal having a frequency dependent on the tone and local oscillator signals.

2. The circuit of claim 1 further comprising a filter to filter the data signal, wherein the filter has a passband bandwidth that depends on the bandwidth of the wireless communication channel.

3. The circuit of claim 1 wherein the SSB modulator further comprises a first mixer to shift the data signal's a spectrum using the tone signal.

4. The circuit of claim 3 wherein the SSB modulator further comprises a summer to add the tone signal to an output signal of the first mixer.

5. The circuit of claim 3 wherein the SSB modulator further comprises a filter to remove a sideband of an output signal of the first mixer.

6. The circuit of claim 3 wherein an output signal of the first mixer comprises a substantially DC-centered composite signal.

7. The circuit of claim 3 wherein the SSB modulator further comprises a second mixer to upconvert a spectrum corresponding to the DC-centered sideband using the local oscillator signal.

8. The circuit of claim 7 wherein the SSB modulator further comprises:
    a third mixer to shift a spectrum of the data signal using a second tone signal that has the same frequency as the tone signal and is in quadrature with the tone signal;
    a second summer to add the second tone signal to an output signal of the third mixer;
    a filter to remove a sideband of an output signal of the third mixer;
    a fourth mixer to upconvert a spectrum corresponding to the DC-centered sideband using a quadrature signal that has the same frequency as the local oscillator signal and is in quadrature with the local oscillator signal; and
    a third coupler to combine the output signals of the second and fourth mixers.

9. The circuit of claim 1 wherein the local oscillator signal is provided to an RF demodulator during the receive phase.

10. The circuit of claim 8 wherein a DC level is provided directly to the second and fourth mixers for upconversion during the receive phase.

11. A computer-readable medium having stored thereon a design of a circuit according to claim 1.

12. A method for generating a single-sideband (SSB) signal, the method comprising:
    generating a tone signal during a transmit phase, the tone signal have a frequency that depends on the baseband bandwidth of the data signal;
    shifting a spectrum of a data signal using the tone signal;
    generating a SSB signal using the spectrum-shifted data signal, wherein the SSB signal has a bandwidth equal to or smaller than a bandwidth of a preselected wireless communication channel; and
    upconverting the SSB signal using a radio frequency (RF) signal having a frequency that is substantially equal to a center frequency of the wireless communication channel.

13. The method of claim 12 further comprising filtering the data signal before shifting the data signal.

14. The method of claim 12 further comprising adding the tone signal to SSB signal before upconverting.

15. The method of claim 12 wherein generating a SSB signal further comprises filtering out a sideband of the spectrum-shifted signal.

16. The method of claim 12 wherein the spectrum-shifted signal comprises a substantially DC-centered sideband signal.

17. The method of claim 12 wherein the RF signal is used to demodulate a signal received during a receive phase.

18. The method of claim 17 further comprising, during the receive phase, providing a DC level to be upconverted instead of the SSB signal.

19. The method of claim 12 further comprising:
    shifting a spectrum of the data signal using a second tone signal that has the same frequency as the tone signal and is in quadrature with the tone signal to provide a quadrature spectrum-shifted data signal;
    generating a quadrature SSB signal using the quadrature spectrum-shifted data signal,
    adding the second tone signal to quadrature SSB signal;
    upconverting a spectrum corresponding to the quadrature SSB signal using a quadrature signal that has a frequency substantially equal to that of the RF signal and is in quadrature with the RF signal; and
    summing the upconverted signals.

20. The method of claim 19 wherein generating a quadrature SSB signal comprises filtering out a sideband of the quadrature spectrum-shifted data signal.

21. The method of claim 19 wherein the RF signal is used to demodulate a signal received during a receive phase.

22. A computer-readable medium having instructions stored thereon that, when executed by a processor, perform a method as recited in claim 12.

23. An apparatus to generate a single-sideband signal in a RFID transceiver, the apparatus comprising:
    means for generating a tone signal during a transmit phase, the tone signal have a frequency that depends on the baseband bandwidth of the data signal;
    means for shifting a spectrum of a data signal using the tone signal;
    means for generating a SSB signal using the spectrum-shifted data signal, wherein the SSB signal has a bandwidth equal to or smaller than a bandwidth of a preselected wireless communication channel; and means for upconverting the SSB signal using a radio frequency (RF) signal having a frequency that is substantially equal to a center frequency of the wireless communication channel.

24. The apparatus of claim 23 further comprising means for filtering the data signal before shifting the data signal.

25. The apparatus of claim 23 further comprising means for adding the tone signal to SSB signal before upconverting the SSB signal.

26. The apparatus of claim 23 wherein the means for generating a SSB signal further comprises a filter to filter out a sideband of the spectrum-shifted signal.

27. The apparatus of claim 23 wherein the spectrum-shifted signal comprises a substantially DC-centered sideband during the transmit phase or a DC-level during the receive phase.

28. The apparatus of claim 23 wherein the RF signal is used to demodulate a signal received during a receive phase.

29. The apparatus of claim 28 further comprising means for providing a DC level to the means for upconverting during the receive phase.

30. The apparatus of claim 23 further comprising:
means for shifting a spectrum of the data signal using a second tone signal that has the same frequency as the tone signal and is in quadrature with the tone signal to provide a quadrature spectrum-shifted data signal;
means for generating a quadrature SSB signal using the quadrature spectrum-shifted data signal,
means for adding the second tone signal to quadrature SSB signal;
means for upconverting a spectrum corresponding to the quadrature SSB signal using a quadrature signal that has a frequency substantially equal to that of the RF signal and is in quadrature with the RF signal; and
means for summing the upconverted signals.

31. The apparatus of claim 30 wherein the means for generating a quadrature SSB signal comprises a filter to filter out a sideband of the quadrature spectrum-shifted data signal.

32. The apparatus of claim 30 wherein the RF signal is used to demodulate a signal received during a receive phase.

33. A computer-readable medium having instructions stored thereon that, when executed by a processor, implement an apparatus as recited in claim 23.

34. A reader for use in an RFID system, the reader comprising:
a tone generator to output a tone signal during a transmit phase, the tone signal have a frequency that depends on a baseband bandwidth of a data signal;
a local signal generator to output a signal having a frequency that is substantially equal to a center frequency of a wireless communication channel;
a SSB modulator coupled to the tone generator and the local signal generator, wherein the SSB modulator is to shift a spectrum of the data signal using the tone signal to form a spectrum-shifted SSB signal, add the tone signal to the shifted SSB signal, and upconvert the spectrum-shifted SSB signal using the output signal of the local signal generator; and
a demodulator to demodulate a received signal from a tag, the demodulator using the output signal of the local signal generator to downconvert the received signal.

35. The reader of claim 34 wherein the spectrum-shifted signal comprises a DC-centered sideband during the transmit phase or a DC-level during the receive phase.

36. The reader of claim 34 wherein the SSB modulator comprises a filter to filter out a sideband of the spectrum-shifted data signal.

* * * * *

UNITED STATES PATENT AND TRADEMARK OFFICE
CERTIFICATE OF CORRECTION

PATENT NO.       : 7,382,257 B2
APPLICATION NO.  : 11/073292
DATED            : June 3, 2008
INVENTOR(S)      : Michael H. Thomas et al.

It is certified that error appears in the above-identified patent and that said Letters Patent is hereby corrected as shown below:

In the drawings:

On Sheet 4 of 8, in FIG. 4 (Below Reference Numeral 412), line 1, delete "$\cos(\omega_c)t$" and insert -- $\cos(\omega_c t)$ --, therefor.

On Sheet 4 of 8, in FIG. 4 (Above Reference Numeral 414), line 1, delete "$\sin(\omega_c)t$" and insert -- $\sin(\omega_c t)$ --, therefor.

On Sheet 5 of 8, in FIG. 5 (Below Reference Numeral 412), line 1, delete "$\cos(\omega_c)t$" and insert -- $\cos(\omega_c t)$ --, therefor.

On Sheet 5 of 8, in FIG. 5 (Above Reference Numeral 414), line 1, delete "$\sin(\omega_c)t$" and insert -- $\sin(\omega_c t)$ --, therefor.

On Sheet 6 of 8, in FIG. 6 (Below Reference Numeral 412), line 1, delete "$\cos(\omega_c)t$" and insert -- $\cos(\omega_c t)$ --, therefor.

On Sheet 6 of 8, in FIG. 6 (Above Reference Numeral 414), line 1, delete "$\sin(\omega_c)t$" and insert -- $\sin(\omega_c t)$ --, therefor.

In column 4, line 58, delete "$\cos(-\omega_M)t$" and insert -- $\cos(-\omega_M t)$ --, therefor.

In column 5, line 59, delete "$\cos(-\omega_M)t$" and insert -- $\cos(-\omega_M t)$ --, therefor.

In column 5, line 61, delete "$\sin(-\omega_M)t$" and insert -- $\sin(-\omega_M t)$ --, therefor.

In column 6, line 15, delete "$\sin(-\omega_M)t$" and insert -- $\sin(-\omega_M t)$ --, therefor.

In column 6, line 20, delete "$\cos(-\omega_M)t$" and insert -- $\cos(-\omega_M t)$ --, therefor.

In column 6, line 25, delete "$\sin(-\omega_M)t$" and insert -- $\sin(-\omega_M t)$ --, therefor.

In column 6, line 35, delete "$\cos(\omega_C)t$" and insert -- $\cos(\omega_C t)$ --, therefor.

UNITED STATES PATENT AND TRADEMARK OFFICE
CERTIFICATE OF CORRECTION

PATENT NO. : 7,382,257 B2
APPLICATION NO. : 11/073292
DATED : June 3, 2008
INVENTOR(S) : Michael H. Thomas et al.

It is certified that error appears in the above-identified patent and that said Letters Patent is hereby corrected as shown below:

In column 6, line 35, delete "$\sin(\omega_C)t.$" and insert -- $\sin(\omega_C t).$ --, therefor.

In column 7, line 7, delete "$\cos(\omega_C)t$" and insert -- $\cos(\omega_C t)$ --, therefor.

In column 7, line 7, delete "$\sin(\omega_C)t,$" and insert -- $\sin(\omega_C t),$ --, therefor.

In column 7, lines 44-45, delete "$\cos(-\omega_M)t$" and insert -- $\cos(-\omega_M t)$ --, therefor.

In column 7, line 46, delete "$\sin(-\omega_M)t$" and insert -- $\sin(-\omega_M t)$ --, therefor.

In column 7, line 56, delete "$\cos(-\omega_M)t$" and insert -- $\cos(-\omega_M t)$ --, therefor.

In column 7, line 61, delete "$\sin(-\omega_M)t$" and insert -- $\sin(-\omega_M t)$ --, therefor.

In column 7, line 66, delete "$\cos(\omega_C)t$" and insert -- $\cos(\omega_C t)$ --, therefor.

In column 7, line 66, delete "$\sin(\omega_C)t,$" and insert -- $\sin(\omega_C t),$ --, therefor.

In column 8, line 1, delete "$\cos(\omega_C)t$" and insert -- $\cos(\omega_C t)$ --, therefor.

In column 8, line 1, delete "$\sin(\omega_C)t.$" and insert -- $\sin(\omega_C t).$ --, therefor.

In column 9, line 45, delete "$\cos(-\omega_M)t,$" and insert -- $\cos(-\omega_M t),$ --, therefor.

UNITED STATES PATENT AND TRADEMARK OFFICE
CERTIFICATE OF CORRECTION

PATENT NO. : 7,382,257 B2
APPLICATION NO. : 11/073292
DATED : June 3, 2008
INVENTOR(S) : Michael H. Thomas et al.

It is certified that error appears in the above-identified patent and that said Letters Patent is hereby corrected as shown below:

In column 9, line 50, delete "$\cos(\omega_C)t$" and insert -- $\cos(\omega_C t)$ --, therefor.

Signed and Sealed this

Fifth Day of May, 2009

JOHN DOLL
*Acting Director of the United States Patent and Trademark Office*